Figure 1:
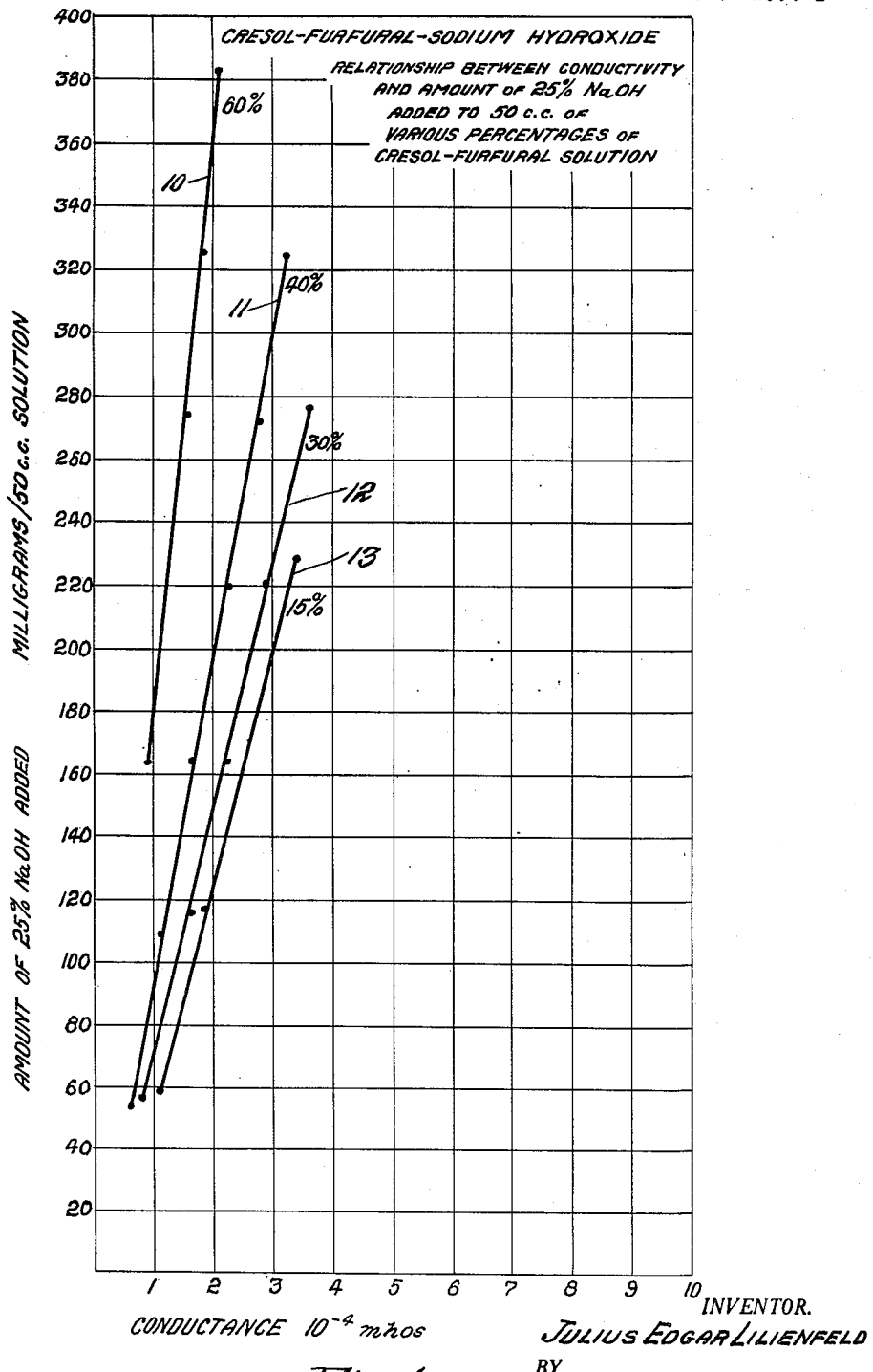

INVENTOR.
JULIUS EDGAR LILIENFELD
ATTORNEY

United States Patent Office 2,941,929
Patented June 21, 1960

2,941,929
ELECTROLYTES

Julius Edgar Lilienfeld, St. Thomas, Virgin Islands, assignor to Samuel D. Warren, Essex, and Ralph F. Burkard, Arlington, Mass.

Filed Aug. 24, 1955, Ser. No. 530,291

10 Claims. (Cl. 204—14)

The invention relates to a class of novel electrolytes for forming anodized films on metals, for example aluminum, magnesium and tantalum, and particularly to the formation thereon of films of the low-leak, high-resistance (dielectric) type; also for use in electrolytic capacitors.

One object of the invention is to provide an electrolyte which will safeguard the metal bodies (electrodes) subject to formation therein against corroding, particularly at the surface of the electrolyte—commonly known as "necking"—as well as to obviate other detrimental actions of the anodizing process upon said metals.

Another object of the invention is to accelerate the formation of the anodized film, and to reduce substantially the amount of the final leakage current once the formation to a given maximum voltage has been carried through to its completion.

Still another object is to provide a substantially anhydrous electrolyte composition consisting of an insulating organic solvent and a binary solute, the dielectric constant of the solvent being substantially in excess of the dielectric constant of the acid component of the solute.

Still another object is to provide an electrolyte which will possess a flammability range adequately meeting requirements.

The invention has for its object, also, to provide an electrolyte suitable for the operation of an electrolytic capacitor throughout a wide range of temperatures, including low temperatures—of the order of arctic temperatures—and with minimum loss of capacity and power.

A further object of the invention is to provide an electrolyte for use in electrolytic capacitors which, when operated on alternating current power lines, will perform steadily with a commercially adequately low power loss over long periods of active use.

A still further object of the invention is to provide an electrolyte for use in a capacitor whereby the leakage current will not substantially increase in idling and so to avoid the otherwise recurrent necessity for a partial reforming operation.

One of the features underlying my invention is the concept that the state of the anodized film is affected by interaction with (OH) ions across the interface film-electrolyte, which interaction produces instability by hydrating and dehydrating the film under various influences. Consequently, it is in effect this interaction which must be limited and stabilized. Thus, the electrolyte has to be essentially anhydrous and of such nature as not to yield hydroxyl groups in uncontrollable profusion. Such an electrolyte is herein referred to as "substantially anhydrous."

The known electrolytes do not possess this feature, inasmuch as they either are liquid solutions in water or have a significant moisture content by virtue of which they acquire conductivity.

Electrical conductance in electrolytes is theoretically being interpreted in present physicochemistry as primarily dependent on the dissociation of a solute in a solvent, and this dissociation, in turn, is determined by the dielectric constant D of the solvent. The conductance therefore increases in proportion to the dissociation and thus is dependent on D. The conductance is also dependent on the viscosity V; and, more specifically, in many cases it is with approximation inversely proportionate to V over large ranges. Thus, the well-known Walden law states that the conductance is proportional to $$\frac{D}{V}$$

Figure 2:
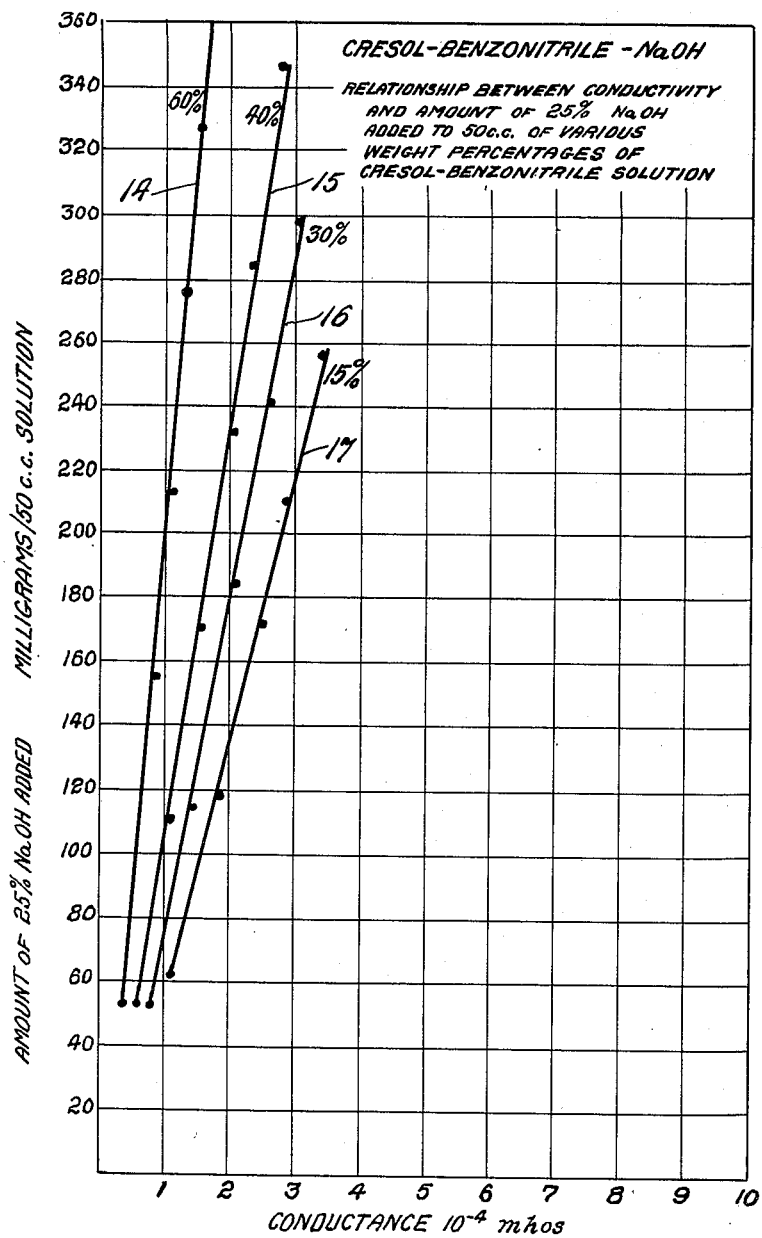

The nature of the invention, however, will best be understood when described in connection with the accompanying drawings, in which:

Figs. 1 and 2 are graphs setting forth the relationship between conductance and the amount of alkali metal component (as 25% hydroxide solution in water thereof), said component being plotted as ordinates against volume percentages of weak organic acid-solvent combinations as abscissae—Fig. 1 setting forth the system cresol-furfural-sodium hydroxide; and Fig. 2, similarly the system cresol-benzonitrile-sodium hydroxide.

Figure 3:
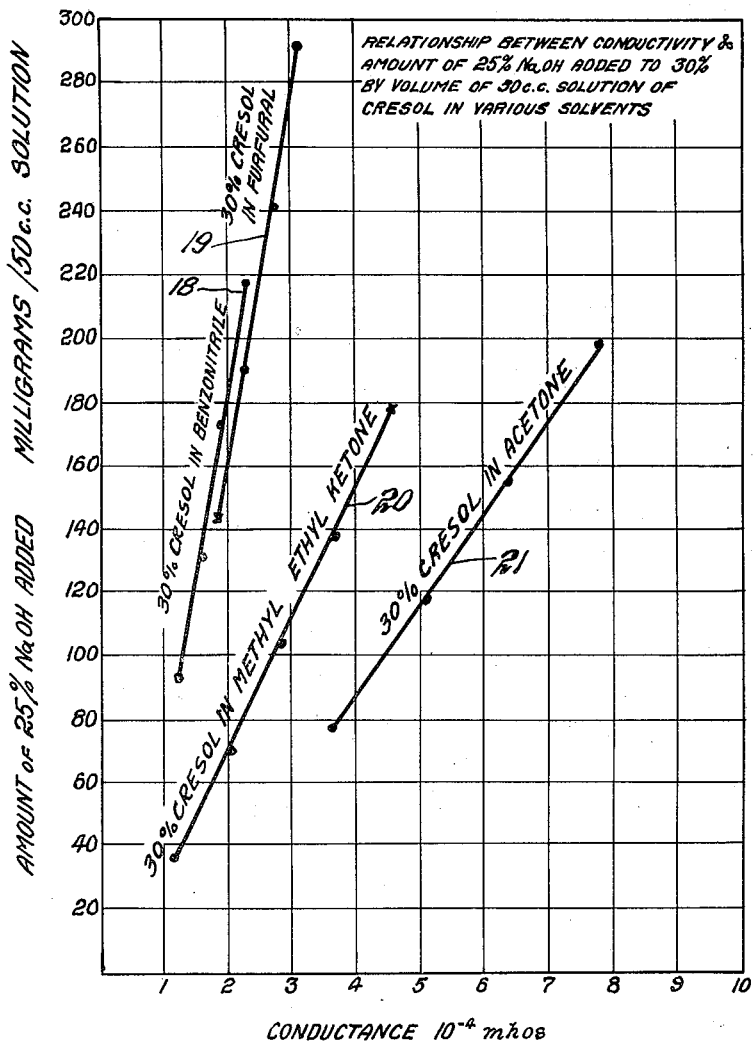

Fig. 3 is a graph showing a similar comparison between systems embodying a 30% cresol solution in benzonitrile, furfural, methyl ethyl ketone, and acetone, respectively, plus sodium hydroxide, the latter component being plotted as ordinates.

Figure 4:
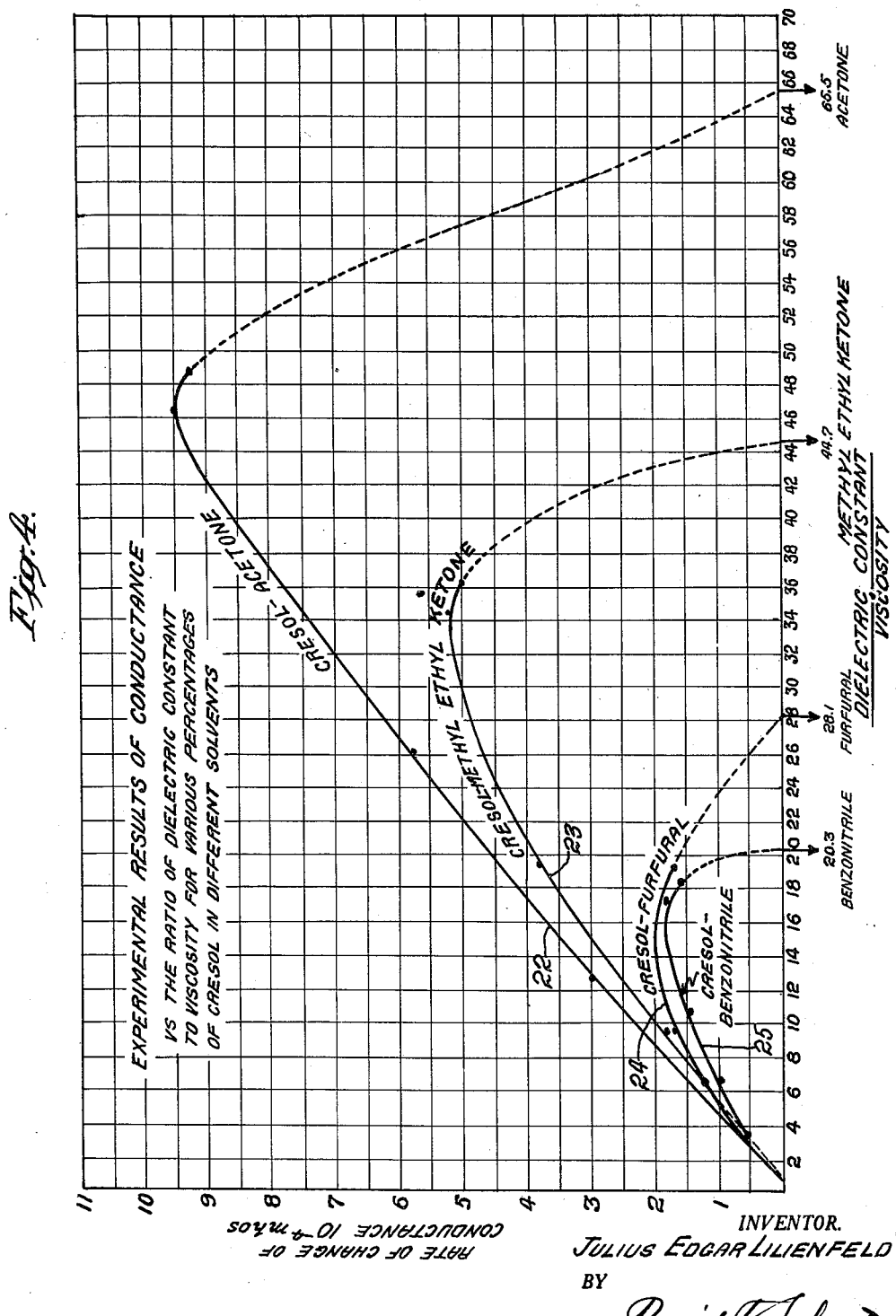

Fig. 4 is a graph showing the relation of the linear rate of change of conductance with sodium hydroxide concentration (which is shown in graphs of the kind of Figs. 1, 2 and 3) plotted as ordinates against the ratio of dielectric constant to viscosity as abscissae, for various percentgaes of the organic acid component (in the cases shown it is cresol) of the electrolyte to various solvent components thereof.

Figure 5:
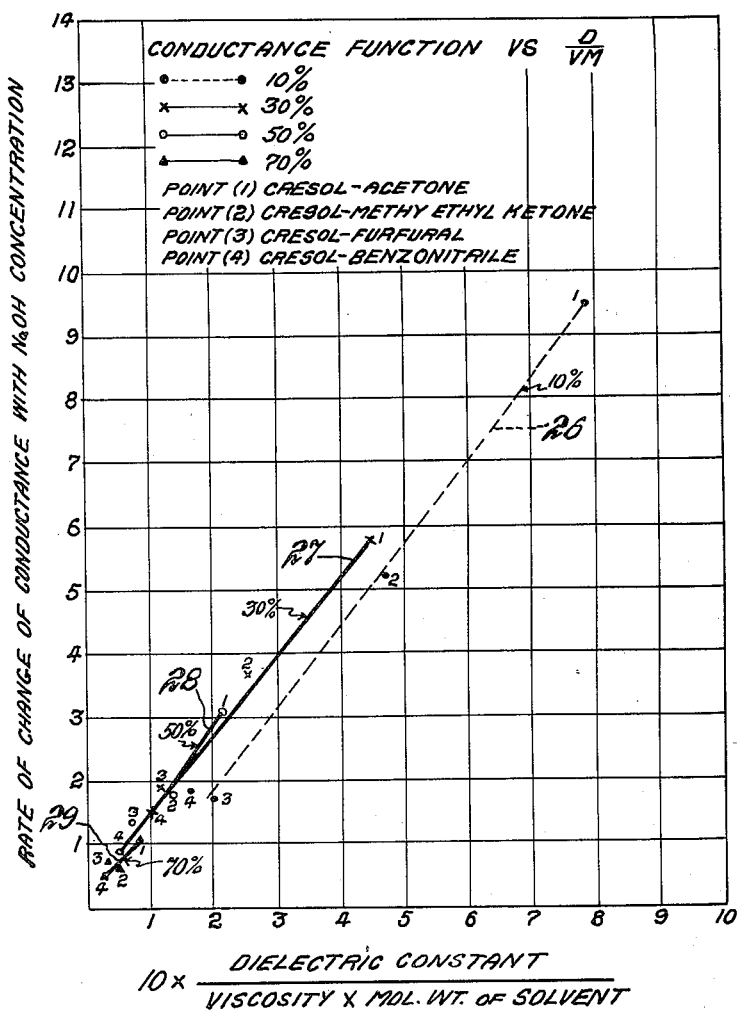

Fig. 5 shows graphs in which the ordinates are of the nature of those used in Fig. 4, the graphs, however, being plotted against different abscissae, viz: against $$\frac{D}{VM}$$

instead of the Walden variable $$\frac{D}{V}$$

M being the molecular weight of the solvent.

Figure 6:
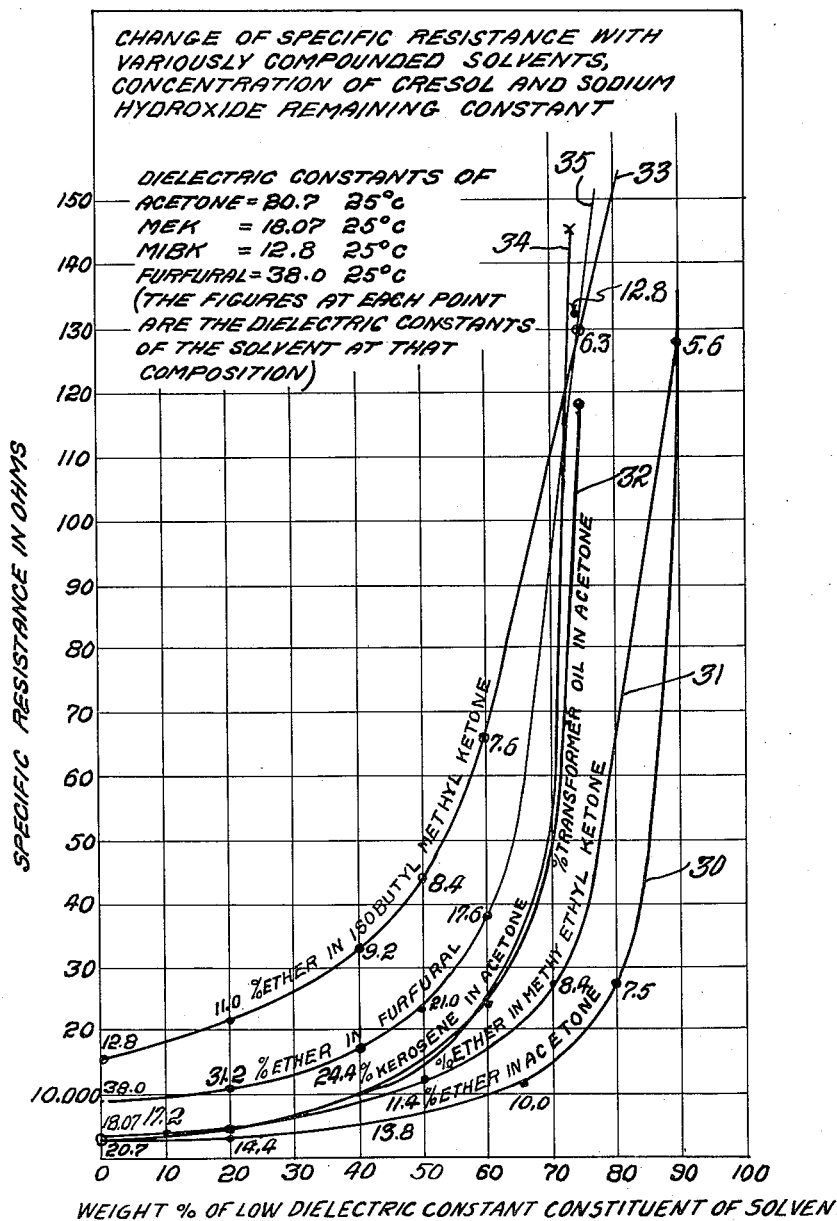

Fig. 6 is a graph setting forth for a solvent, composed of more than one compound, the specific resistance of the electrolyte (as ordinates) in relation to various percentages of the solvent components, as abscissae.

Referring to Figs. 1, 2 and 3, these fundamental graphs on which the subsequent presentation of the subject is based show the relation between conductance (axis of abscissae) and the concentration of sodium hydroxide (axis of ordinates). It is seen that all of these graphs are strictly linear; and this is one of the significant features of the studied phenomenon.

In the case of Fig. 1, the plots 10, 11, 12 and 13 show dependence of conductance on the concentration by volume of cresol in various percentage combinations of cresol-furfural solutions, as noted.

In Fig. 2 the same dependence of concentration by volume is shown by the plots 14, 15, 16 and 17 for a cresol-benzonitrile solution; while Fig. 3 refers to the constant concentration by volume of 30% cresol in solutions of cresol in benzonitrile, furfural, methyl ethyl ketone, and acetone, as may be read on the respective plots 18, 19, 20 and 21.

As stated hereinbefore, the further study of the phenomenon starts from the Figs. 1, 2 and 3. The important quantity is represented by the rate of change of conductance with the change of sodium concentration. This quantity is represented by the cotangents of the angle formed by the rectilinear plots, Figs. 1, 2 and 3, with the axis of the abscissae against the percentage, by volume, of cresol in various solvents as abscissae.

Fig. 4 presents the aforesaid quantities as ordinates in the plots 22, 23, 24 and 25, respectively for cresol-acetone, cresol-methyl ethyl ketone, cresol-furfural, and cresol-benzonitrile solutions. The continuous-line portions of the plots refer to the observed data; and the broken-line portion represents the interpolation toward the intersection with the axis of abscissae, which intersection is known inasmuch as it has been stated as the nature of the invention that the conductance in absence of the acid component of the solution is negligible. It is seen that by plotting said cotangents against the ratio of $$\frac{D}{V}$$

rather complicated plots are obtained showing that—in contradistinction to aqueous electrolytes—the Walden law does not in any single case, even with rough approximation, apply. The plots can be analytically expressed by a rather involved function with constants changing from solvent to solvent; but a so-empirically obtained analytical relation is hardly likely to lead to a comprehensive physicochemical interpretation. However, in case a chemically homogeneous solvent of the molecular weight M is used, it is seen from Fig. 5 that by plotting the values represented by the ordinates as $$10\frac{D}{VM}$$

(plots 26, 27, 28 and 29) and so long as the acid concentration is not much higher than 60% and not much lower than 20%, a fairly narrow band between two straight lines is obtained which includes all data observed with a great variety of solvents. Indeed, points related to concentrations above 20% crowd along the extended straight line, while the 20% points lie along the somewhat lower parallel dotted straight line.

While thus no simple conductance function may be obtained with $$\frac{D}{V}$$

as variable, such a function exists with $$\frac{D}{VM}$$

as variable, at least with considerable approximation. This relationship points the way to a physicochemical interpretation. It is a very distinctive characteristic of the novel substantially anhydrous electrolytes in contradistinction to the electrolytes studied heretofore.

This becomes especially significant when considered in conjunction with the aforesaid basic observation, to wit: that conductance is within a very wide range a linear function of the concentration of the alkaline component.

As also highly significant it is to be noted that tests made by me indicate that small traces of water do not noticeably affect the plots, Figs. 1–5.

Another very distinctive feature of the novel electrolytes is that in the case of a chemically homogeneous solvent its dielectric constant has to be no lower than that of the acid component of the solute. Thus, for instance, the following may be used as solvents to afford adequate conductivity:

|  | Formula | D | T,° C. |
| --- | --- | --- | --- |
| Acetone | $C_3H_6O$ | 20.7 | 25 |
| Methyl ethyl ketone | $C_4H_8O$ | 18.07 | 25 |
| Methyl isobutyl ketone | $C_6H_{12}O$ | 13.1 | 20 |
| Benzonitrile | $C_7H_5N$ | 25.2 | 25 |
| Lactonitrile | $C_3H_5NO$ | 38.0 | 20 |
| Furfural | $C_5H_4O_2$ | 38.0 | 25 |
| Benzaldehyde | $C_7H_6O$ | 17.0 | 20 |
| Acetophenone | $C_8H_8O$ | 17.39 | 25 |
| Butyraldehyde | $C_4H_8O$ | 13.4 | 26 |

Among solvents of which $D<12$, with which adequate conductance is not obtainable, are the following:

|  | Formula | D | T,° C. |
| --- | --- | --- | --- |
| Anisole | $C_7H_8O$ | 4.33 | 25 |
| Benzene | $C_6H_6$ | 2.28 | 20 |
| Aniline | $C_6H_7N$ | 6.89 | 20 |
| Tert-amyl alcohol | $C_5H_{12}O$ | 5.82 | 25 |

It is to be noted, however, that the latter statement may not fully apply in cases in which the solvent undergoes a chemical change when compounded to form an electrolyte. For instance, the following solvents of a small dielectric constant will afford conductivity when combined with much larger concentrations of the alkali metal (Na) then in the case of the aforesaid ones. By examining such cases, it is found that some of the solvent molecules have been modified and have acquired a polar nature.

| 4-Heptanone | $C_7H_{14}O$ | 12.5 | 20 |
| --- | --- | --- | --- |
| Ethyl acetate | $C_2H_4O_2$ | 6.15 | 20 |
| Diethyl ether | $C_4H_{10}O$ | 4.33 | 20 |

While all the aforesaid refer to chemically homogeneous solvents of a definite molecular weight M, solvents may be compounded by mixing two or more compounds of different molecular weights $M_1$, $M_2$, etc. In such case at least one of the components has to have a dielectric constant higher than that of the acid to be used, but the dielectric constant of the so-compounded, chemically not homogeneous solvent need not necessarily be higher than that of the acid. For instance, in mixing acetone with diethyl ether, fairly good conductance may be obtained with no more than 20% acetone in the composition.

As the graph, Fig. 6, shows, when the concentration, for example, of acetone in the acetone ether solvent plot 30 (both Na and acid compounds remaining constant) is decreased from 90% to 20%, the resistance increases from 3,000 ohms to 27,000 ohms almost linearly until a dielectric constant of between 7.5–8.5 is reached, and by decreasing the acetone concentration beyond that, an almost discontinuously rapid increase of resistance to about $10^6$ ohms is observed. It will be apparent, therefore, that up to the aforesaid 20% acetone point, merely by adding a minor amount of Na, conductivity adequate for condenser construction may be obtained; but with less than 20% acetone, an undue excess of Na would be required.

In interpreting the said graph of Fig. 6, consideration must be given to the following. When the diethyl ether concentration in the acetone-ether solvent is increased, the viscosity of the solvent drops, and it is known that the resistance decreases proportionately. To aid in understanding this graph it is to be remembered that the dielectric constants in the upper region approach 4.3 for di-ethyl ether, 2.0 for kerosene, and 2.2 for transformer oil, respectively. Simultaneously, the dielectric constant of said mixture decreases, which results in an increase of resistance. This increase is, as I found in my investigation, nonlinear, and occurs at a much faster rate, thereby strongly overcoming the aforesaid decrease, so that as a result the resistance increases. The increase becomes very rapid once the dielectric constant falls below the interval 7.5–8.5. It is noteworthy that when said plot is corrected so as to eliminate the decrease of resistance due to decrease of viscosity, the so-corrected value of the aforesaid dielectric constant interval 7.5–8.5 is raised by a few units. Plots 31, 32, 33, 34 and 35, other than the aforesaid one 30 referring to acetone, are indicated for various solvents.

Preferably in carrying out the invention, in compounding the novel electrolyte, solvent means of the aforesaid nature (substantially anhydrous) are to be combined with a solute comprising components of both classes—weak organic acids having low dielectric constants (generally less than 12) and alkali metal bases as cationogens. The latter term refers to a substance which produces positive ions when in solution; and I have found that a minor quantity thereof will produce the desired conductivity provided a correspondingly adequate quantity of acid is present.

Solvents for the aforesaid purpose are to be found among organic compounds, preferably such as contain oxygen (O) in the molecule. For example, the following solvents have been found to give satisfactory results, viz: ketones, such as acetone, methyl ethyl ketone, methyl isobutyl ketone, and acetophenone; aldehydes such as furfural, butyraldehyde, benzaldehyde; and also nitriles such as benzonitrile and lactonitrile.

As a suitable organic acid (anionogen), I prefer an acid of the aromatic class including phenol, nonyl phenol, other phenols; also cresol, para, ortho and meta cresol, and xylenol; and as a cationogen, alkali metals such as sodium, potassium, lithium, etc., may be utilized. It is to be understood, however, that the acid component is to be greatly in excess of the alkali metal component.

In order to compound with the three aforesaid components (solvent, acid and alkali metal) an electrolyte which would be most advantageous in the operation of a capacitor, it is technologically advisable that said electrolyte should have a predetermined specific resistance, to comply with conditions as presented by the mechanical design and other technical features. A predetermined resistance, however, is not a sufficient condition to define the relative concentrations. Indeed, it is possible, within a wide range, arbitrarily to take any concentration of the acid component and then to find a corresponding concentration of the alkali metal component such as to result in a definite specific resistance of the compound. Yet, not all such compounds with an equal resistance are suitable for use, and I found that to provide a suitable electrolyte it must be compounded within a range which is indicated by the function peculiar to the specific solvent-acid-alkali metal system which is intended for use.

In an electrolyte of this nature, films may be formed not only on aluminum or tantalum, but also on such metals as do not ordinarily permit anodization, especially the formation thereon of films of an adequate dielectric nature by conventional methods, for example, on magnesium.

The following compositions of electrolyte have been found to afford satisfactory results:

| | | |
|---|---|---|
| USP Phenol (melted) | cc | 188.0 |
| CP Acetone | cc | 537.5 |
| NaOH (25% solution) | cc | 1.07 |
| USP Phenol (melted) | gms | 160.0 |
| Furfural | gms | 240.0 |
| NaOH (25 solution) | cc | 1.43 |
| USP Phenol (melted) | gms | 120.0 |
| Benzonitrile | gms | 180.0 |
| NaOH (25% solution) | cc | 1.65 |
| USP Cresol | gms | 160 |
| Furfural | gms | 240 |
| NaOH (25% solution) | cc | 1.7 |
| USP Cresol | gms | 120.0 |
| CP Acetone | gms | 280.0 |
| NaOH (25% solution) | cc | 0.48 |
| USP Cresol | gms | 120.0 |
| Methyl ethyl ketone | gms | 280.0 |
| NaOH (25% solution) | cc | 0.78 |
| USP Cresol | gms | 154.0 |
| Diethyl ketone | gms | 286.0 |
| NaOH (25% solution) | cc | 1.90 |

As examples embodying solvents consisting of multiple components, the following afford usable electrolytes:

| | | |
|---|---|---|
| Cresol | gms | 36 |
| Transformer oil | gms | 30 |
| Acetone | gms | 30 |
| NaOH (25% solution) | cc | 0.72 |

(Sp. R about 3,100 ohms/cc.)

| | | |
|---|---|---|
| Cresol | gms | 18 |
| Kerosene | gms | 15 |
| Acetone | gms | 15 |
| NaOH (25% solution) | cc | 0.39 |

(Sp. R about 2,700 ohms/cc.)

Another feature to be noted in connection with the operation of the novel capacitor pertains to the initial leak as observed after idling the respective condensers for a period of several hours. This leak, in the case of the capacitor with the novel substantially non-aqueous electrolyte, is not much different from the one observed before idling, while the initial leak in the case of a capacitor with aqueous electrolyte I have found to be significantly greater. This is an important discovery because it results in a far longer "shelf life" for capacitors made in accordance with my invention, a great advantage both in their commercial distribution and sale and in their use by the ultimate purchaser.

Also, the novel capacitor, by virtue of the use of the substantially non-aqueous electrolyte, is capable of operation at low ambient temperatures with relatively inexpensive, commercial-grade electrode metals such as aluminum in place of the heretofore-required tantalum.

I have found that magnesium may be substituted for the aluminum as electrode material.

Aside from possessing all the desirable features of known capacitors, my novel capacitor is most suitable for long and efficient service at low temperatures and also on alternating current power lines and the like.

This application is in part a continuation of my application for United States Letters Patent Serial No. 378,570, filed August 31, 1953, now Pat. No. 2,826,724, for Electrolyte and Novel Capacitor Utilizing the Same, to which reference may be made for additional illustrative examples of the nature and limiting proportions of the ingredients and their mode of use.

I claim:

1. An essentially non-aqueous composition for anodizing and maintaining films on metals consisting essentially of a substantially insulating organic compound of the aldehyde group having no less than four and no more than seven carbon atoms as solvent, and a binary solute containing a weak acid of the hydroxy benzene class and an alkali metal compound, the solvent having at least one component the dielectric constant of which is significantly in excess of the dielectric constant of the weak acid component of the solute.

2. An electrolyte according to claim 1, wherein the solvent is of the aldehyde group consisting of furfural and butyraldehyde.

3. An electrolyte according to claim 2, consisting of furfural, cresol and sodium hydroxide.

4. An electrolyte according to claim 2, consisting of furfural, phenol and sodium hydroxide.

5. An electrolyte according to claim 4, wherein the respective components of the electrolyte are present substantially in the following proportions by weight: furfural 240 parts, phenol 160 parts, and sodium hydroxide 1.43 parts (25% solution in water).

6. A substantially anhydrous electrolyte for electrolytic capacitors consisting essentially of at least one substantially insulating organic solvent characterized by a component of the aldehyde group having no less than four and no more than seven carbon atoms, and a binary solute having as a major component a weak acid of the hydroxy benzene class and as a minor component an alkali metal compound, wherein said solvent component has a dielectric constant significantly in excess of the dielectric constant of said acid component of the solute.

7. An electrolyte according to claim 6, wherein the solvent consists of a plurality of insulating organic compounds all of which have a dielectric constant significantly in excess of the dielectric constant of the acid component of the solute.

8. An electrolyte according to claim 6, wherein the organic acid component of the solute is of the monohydric phenol class.

9. An electrolyte according to claim 8, wherein the organic acid component of the solute is of the group consisting of phenol; nonyl phenol; cresol; para, ortho and meta cresol; and xylenol.

10. An electrolyte for an electrolytic capacitor adapted for operation over a wide temperature range and under fluctuating voltages, said electrolyte consisting essentially of a substantially insulating oxyhydrocarbon solvent characterized by an aldehyde having from four to seven carbon atoms and a solute comprising a monohydric phenol and an alkali metal compound, the phenol being in excess of the alkali metal compound.

References Cited in the file of this patent

UNITED STATES PATENTS

| | | |
|---|---|---|
| 2,024,210 | Edelman | Dec. 17, 1935 |
| 2,036,669 | Yngve | Apr. 7, 1936 |
| 2,826,724 | Lilienfeld | Mar. 11, 1958 |